United States Patent
Li (10) Patent No.: US 12,349,164 B2
(45) Date of Patent: Jul. 1, 2025

(54) METHOD AND DEVICE FOR DATA TRANSMISSION, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 355 days.

(21) Appl. No.: 17/911,494

(22) PCT Filed: Mar. 16, 2020

(86) PCT No.: PCT/CN2020/079548
§ 371 (c)(1),
(2) Date: Sep. 14, 2022

(87) PCT Pub. No.: WO2021/184170
PCT Pub. Date: Sep. 23, 2021

(65) Prior Publication Data
US 2023/0354361 A1    Nov. 2, 2023

(51) Int. Cl.
*H04W 72/232*    (2023.01)
*H04W 72/1263*    (2023.01)

(52) U.S. Cl.
CPC ..... *H04W 72/232* (2023.01); *H04W 72/1263* (2013.01)

(58) Field of Classification Search
CPC .............. H04W 72/1263; H04W 72/232
See application file for complete search history.

(56) References Cited

U.S. PATENT DOCUMENTS

| | | | | |
|---|---|---|---|---|
| 2018/0192408 A1* | 7/2018 | Pelletier | .......... | H04W 36/00692 |
| 2021/0037484 A1* | 2/2021 | Zhou | .................. | H04W 52/386 |
| 2021/0258993 A1* | 8/2021 | Takeda | .................. | H04W 76/27 |
| 2022/0360408 A1* | 11/2022 | Jung | ..................... | H04L 5/0058 |
| 2022/0368493 A1* | 11/2022 | Yang | ..................... | H04B 7/0695 |

FOREIGN PATENT DOCUMENTS

CN    110621073 A    12/2019

OTHER PUBLICATIONS

European Patent Application No. 20925614.8, Search and Opinion dated Oct. 26, 2023, 9 pages.
Qualcomm Incorporated "On multi-TRP and multi-panel transmission" 3GPP TSG RAN WG1 NR Ad-Hoc #2, R1-1711157, Jun. 2017, 4 pages.
PCT/CN2020/079548 International Search Report dated Dec. 16, 2020; 2 pages.
Mediatek "Multi-TRP and multi-panel transmission"; 3GPP TSG RAN WG1 NR Ad Hoc #3; R1-1716211; Sep. 2017; 4 pages.

* cited by examiner

*Primary Examiner* — Sulaiman Nooristany
(74) *Attorney, Agent, or Firm* — Cozen O'Connor (57) ABSTRACT

A method for data transmission includes: receiving at least two PDCCHs and transmitting at least two data channels, in which the at least two data channels are scheduled by the at least two PDCCHs; and the at least two PDCCHs carry same content, or the at least two data channels carry same content, or the at least two PDCCHs carry same content and the at least two data channels carry same content.

6 Claims, 5 Drawing Sheets

| PDCCH#1 | PDCCH#2 | Data#1 | Data#2 |

(a)

| PDCCH#1 | Data#1 | PDCCH#2 | Data#2 |

| PDCCH#1 | PDCCH#2 | Data#11 | Data#12 | Data#21 | Data#22 |

(a)

| PDCCH#1 | Data#11 | Data#12 | PDCCH#2 | Data#21 | Data#22 |

METHOD AND DEVICE FOR DATA TRANSMISSION, AND STORAGE MEDIUM

CROSS-REFERENCE TO RELATED APPLICATION

This application is the national phase of International Application No. PCT/CN2020/079548, filed on Mar. 16, 2020, the content of which is hereby incorporated by reference in its entirety into this disclosure.

TECHNICAL FIELD

The disclosure relates to the field of communication technologies, and in particularly, to a method for data transmission, a communication device, and a storage medium.

BACKGROUND

In the wireless 5G communication technology known as New Radio (NR), a terminal device can improve communication robustness by receiving data of a certain channel that is repeatedly sent by a network device.

In the related art, multiple transmission-reception points/panels (multi-TRP/panel) based inter-cell have been proposed, so that the terminal device can receive a physical downlink shared channel (PDSCH) repeatedly sent by the network device.

Data of a data channel such as the PDSCH are scheduled by a physical downlink control channel (PDCCH). When data are repeatedly sent/received, there is no better solution on how to join control channels and data channels for data transmission in the related art.

SUMMARY

According to an aspect of the disclosure, a method for data transmission is provided. The method is applicable to a terminal device and includes: receiving at least two PDCCHs and transmitting at least two data channels, in which the at least two data channels are scheduled by the at least two PDCCHs; and the at least two PDCCHs carry same content, or the at least two data channels carry same content, or the at least two PDCCHs carry same content and the at least two data channels carry same content.

According to an aspect of the disclosure, a method for data transmission is provided. The method is applicable to a network device and includes: sending at least two PDCCHs and transmitting at least two data channels, in which the at least two data channels are scheduled by the at least two PDCCHs; and the at least two PDCCHs carry same content, or the at least two data channels carry same content, or the at least two PDCCHs carry same content and the at least two data channels carry same content.

According to an aspect of the disclosure, a terminal device is provided. The terminal device includes: a processor; a transceiver connected to the processor; and a memory for storing instructions executable by the processor; in which the processor is configured to load and execute the instructions to perform the method for data transmission as described in the above aspect.

According to an aspect of the disclosure, a network device is provided. The terminal device includes: a processor; a transceiver connected to the processor; and a memory for storing instructions executable by the processor; in which the processor is configured to load and execute the instructions to perform the method for data transmission as described in the above aspect.

According to an aspect of the disclosure, a computer-readable storage medium is provided. The computer-readable storage medium has stored therein executable instructions that are loaded and executed by a processor to perform the method for data transmission as described in the above aspect.

BRIEF DESCRIPTION OF THE DRAWINGS

To describe the technical solutions more clearly in embodiments of the disclosure, the following will briefly introduce the accompanying drawings used in the description of the embodiments. Obviously, the accompanying drawings in the following description are only some embodiments of the disclosure. For those skilled in the art, other drawings can be obtained from these accompanying drawings without creative work.

DETAILED DESCRIPTION

To make objectives, technical solutions, and advantages of the disclosure clearer, the following further describes embodiments of the disclosure in detail with reference to the accompanying drawings.

Figure 1:
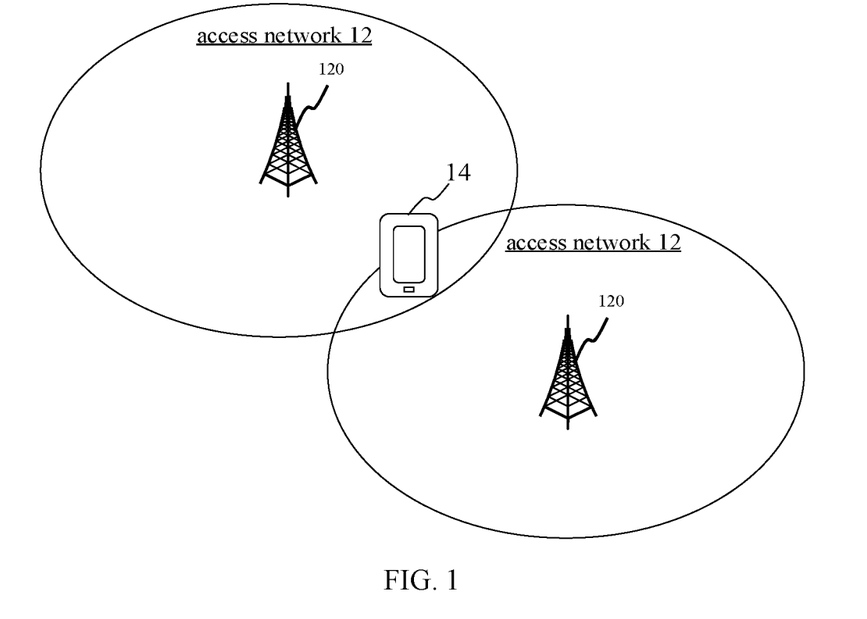
FIG. 1 is a block diagram of a communication system according to some embodiments of the disclosure.

FIG. 1 illustrates a block diagram of a communication system according to some embodiments of the disclosure. The communication system includes access networks 12 and terminal devices 14.

The access network 12 includes several network devices 120. The network device 120 may be a base station that is a device deployed in the access network to provide wireless communication functions for the terminal devices. The base stations may include various forms of macro base stations, micro base stations, relay stations, access points, and the like. In systems using different wireless access technologies, names of devices with base station functions may be different. For example, in long term evolution (LTE) systems, they are called eNodeB or eNB; and in fifth-generation (5G) NR systems, they are called gNodeB or gNB. As communication technologies evolve, the description of the "base station" may change. To facilitate the description in embodiments of the disclosure, the above-mentioned devices for providing wireless communication functions for the terminal devices 14 are collectively referred to as network devices.

The terminal devices 14 may include various handheld devices with wireless communication functions, vehicle-mounted devices, wearable devices, computing devices or other processing devices connected to wireless modems, as well as various forms of user equipment, mobile stations (MS), terminal devices and the like. To facilitate the description, the above-mentioned devices are collectively referred to as terminal devices. The network device 120 and the terminal device 14 communicate with each other through a certain air interface technology, such as a Uu interface.

The technical solutions of embodiments of the disclosure can be applicable to various communication systems, such as: global system of mobile communication (GSM), code division multiple access (CDMA) system, wideband code division multiple access (WCDMA) system, general packet radio service (GPRS), LTE system, LTE frequency division duplex (FDD) system, LTE time division duplex (TDD) system, advanced long-term evolution (LTE-A) system, NR system, NR evolution system, LTE-based access to unlicensed spectrum (LTE-U) system, NR-U system, universal mobile telecommunication system (UMTS), worldwide interoperability for microwave access (WiMAX) communication system, wireless local area network (WLAN), wireless fidelity (Wi-Fi), next-generation communication system or other communication systems.

Generally, conventional communication systems support a limited number of links and are easy to implement. However, with the development of communication technologies, mobile communication systems not only support conventional communications, will also support, for example, device to device (D2D) communication, machine to machine (M2M) communication, machine type communication (MTC), vehicle to vehicle (V2V) communication, vehicle to everything (V2X) system, and the like. Embodiments of the disclosure can also be applicable to these communication systems.

In the 5G NR system, the network device 120 includes N transmission-reception points (TRPs).

Figure 2:
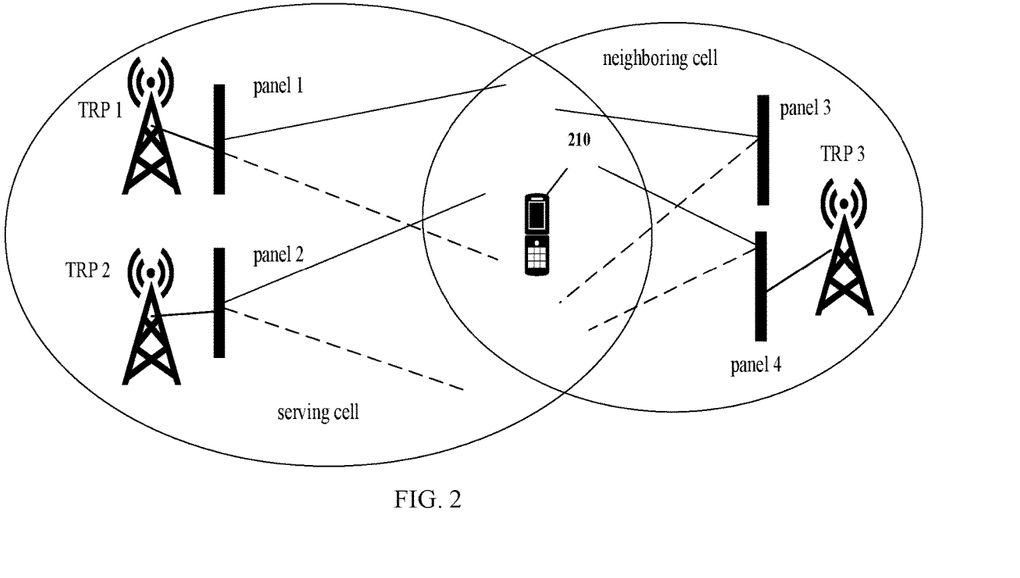
FIG. 2 is a schematic diagram of data transmission based on multiple TRPs or multiple panels (multi-TRP/panel) according to some embodiments of the disclosure.

FIG. 2 illustrates a schematic diagram of data transmission based on multiple TRPs or multiple panels (multi-TRP/panel) according to some embodiments of the disclosure.

The terminal device 210 is in a serving cell and in a neighboring cell.

Each cell can be covered by more than one TRP. As illustrated in FIG. 2, the serving cell is jointly covered by TRP 1 and TRP 2, thereby increasing a coverage radius of the serving cell. The neighboring cell is covered by TRP 3.

Each TRP can be provided with more than one panel. Orientations of different panels can be different, so that beams of different directions can be sent and received, thereby realizing multi-space diversity. In some embodiments, TRP 1 and TRP 2 each includes a panel: TRP 1 includes panel 1, and TRP 2 includes panel 2; and TRP 3 includes two panels: panel 3 and panel 4.

The network device may use multiple panels (multiple panels may come from the same TRP or different TRPs) to simultaneously send PDCCH(s) to the terminal device 210. In this case, transmission directions of different panels are different, so the terminal device 210 also needs to use different panels to receive PDCCH(s), and the network device needs to indicate different transmission configuration indication (TCI) states to the terminal device. Each TCI state corresponds to a reception beam direction on each panel of the terminal device. Through the above beam-based transmission manners, coverage can be ensured.

In detail, the network device may indicate a TCI state of type D through a signaling, to inform the terminal device 210 of a reception beam to be used when receiving. Each TCI state corresponds to a reference signal (RS) identifier, and the RS can be either a channel state information reference signal (CSI-RS), or a synchronization signal block (SSB), or a sounding reference signal (SRS).

When the signaling indicates the TCI state information of type D and instructs the terminal device 210 to receive the PDCCH, the terminal device 210 uses the Rx beam used when the reception power is the largest when the RS corresponding to the RS identifier in the TCI state information is received, to receive the PDCCH, as shown in Table 1.

TABLE 1

| TCI state information | RS index |
| --- | --- |
| TCI#0 | SSB index#1 |
| TCI#1 | SSB index#2 |
| TCI#2 | CSI-RS index#5 |
| TCI#3 | CSI-RS index#6 |
| ... | ... |

For some examples, if the network device informs the terminal device 210 to use TCI #0, it informs the terminal device 210 to use the Rx beam with the maximum reception power when receiving SSB index #1 to receive the PDCCH.

The network device can also indicate beam information by indicating spatial relation information. Each spatial relationship information corresponds to an RS identifier, and the RS can be a CSI-RS, an SSB, or an SRS.

Figure 3:
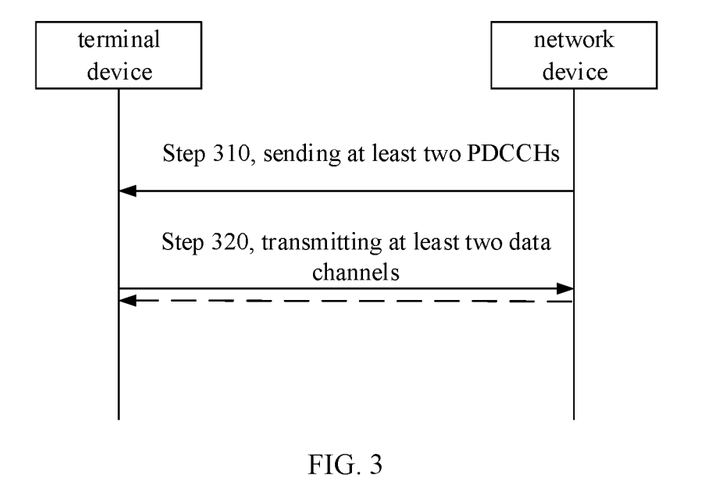
FIG. 3 is a flowchart of a method for data transmission according to some embodiments of the disclosure.

FIG. 3 illustrates a schematic diagram of a method for data transmission according to some embodiments of the disclosure. The method can be applicable to the terminal device and the network device in FIG. 1. The method includes the following steps.

In step 310, the network device sends at least two PDCCHs to the terminal device.

Correspondingly, the terminal device receives the at least two PDCCHs.

The PDCCH is a downlink control channel sent by the network device to the terminal device. The PDCCH carries scheduling and other control information, including at least one of: transmission format, resource allocation, uplink scheduling permission, power control, and retransmission information.

In step 320, at least two data channels are transmitted between the terminal device and the network device.

The at least two data channels are scheduled by the at least two PDCCHs for transmission. The at least two PDCCHs and the at least two data channels employ the joint repeat transmission, that is: the at least two PDCCHs carry same content, or the at least two data channels carry same content, or the at least two PDCCHs carry same content and the at least two data channels carry same content.

One PDCCH can schedule one data channel. One data channel can be the only data channel; or a set of the same data channels that use mini-slots or slots for multiple repeat transmissions/receptions.

Optionally, the at least two PDCCHs carry same content, which means that the at least two PDCCHs carry the same downlink control information (DCI) signaling. Through the DCI signaling, data transmission between the terminal device and one or more panels can be scheduled, and panels can belong to the same TPR or different TPRs or different cells.

The data channel may be a downlink data channel sent by the network device to the terminal device, or an uplink data channel sent by the terminal device to the network device, which is not limited in the disclosure. If the at least two data channels are downlink data channels sent from the network device to the terminal device, the network device sends the at least two data channels, and the terminal device receives the at least two data channels; if the at least two data channels are sent from the terminal device to the network device, the terminal device sends the at least two data channels, and the network device receives the at least two data channels.

Optionally, the at least two data channels carry same content, which means that each data channel sends the same data. If the at least two data channels are uplink data channels, the at least two data channels carry the same uplink data; if the at least two data channels are downlink data channels, the at least two data channels carry the same downlink data.

It should be noted that the disclosure does not limit the execution order of step 310 and step 320. Step 310 may be implemented before step 320, and some actions in step 310 may also be implemented after some actions in step 320. For example: after "sending the at least two PDCCHs" in step 310 is completed, "transmitting the at least two data channels" in step 320 is implemented; or after sending one PDDCH in step 310, transmitting the corresponding data channel is implemented, and then it proceeds to step 310 to perform PDCCH transmission.

In summary, with the method provided in some embodiments, the at least two PDCCHs and the at least two data channels can be sent/received between the terminal device and the network device. The at least two PDCCHs carry same content, or the at least two data channels carry same content, or the at least two PDCCHs carry same content and the at least two data channels carry same content, to realize the joint repeat transmission of control channels and data channels, which improves the communication robustness.

In some alternative embodiments based on FIG. 3, the network device and the terminal device may be based on multiple TRPs or multiple panels (multi-TRP/panel), and the joint repeat transmission of control channels and data channels may be performed through multiple beams.

The following explains the transmission of the at least two PDCCHs through multi-beam based on multi-TRP/panel.

In some optional embodiments, the network device uses different sending beams to send the at least two PDCCHs. Correspondingly, the terminal device uses different reception beams to receive the at least two PDCCHs.

In one possible design, the at least two PDCCHs are from different cells. In another possible design, the at least two PDCCHs are from different TRPs of a same cell. In another possible design, the at least two PDCCHs are from different panels at the same TRP.

For the network device, in one possible design, the network device sends the at least two PDCCHs through different cells. In another possible design, the network device sends the at least two PDCCHs through different TRPs of a same cell. In another possible design, the network device sends the at least two PDCCHs through different panels at the same TRP.

The at least two PDCCHs are sent by the network device through different panels. Different panels may belong to different cells, or belong to different TRPs of a same cell, or belong to different panels of the same TRP. Since different panels have different transmission directions, the terminal device also needs to use different panels (corresponding to different reception beams) to receive the at least two PDCCHs.

For some examples, the at least two PDCCHs include a first PDCCH and a second PDCCH. The first PDCCH is from the serving cell, and the second PDCCH is from the neighboring cell. The network device uses sending beam a and sending beam b to respectively sends the above two PDCCHs, and the terminal device uses corresponding reception beam c, and reception beam d respectively receives the above two PDCCHs.

Optionally, the terminal device may determine the reception beam through TCI state information or spatial relation information. The process for the terminal device to determine the reception beam through TCI state information (or spatial relationship information) may include: the network device notifies the terminal device of at least one piece of TCI state information (or spatial relationship information) through a radio resource control (RRC) signaling, which may include the identifier of the TCI state information (or spatial relationship information) and its corresponding RS type and RS identifier; if the RRC signaling informs multiple pieces of TCI state information (or spatial relationship information), the network device reuses a media access control (MAC) signaling to activate one piece of TCI state information (or spatial relationship information) among the above-mentioned multiple pieces of TCI state information (or spatial relationship information), and the activated TCI state information (or spatial relationship information) is the TCI state information (or spatial relationship information) that the network device configures for the terminal device, that is, the network device informs the terminal device that the reception beam used when receiving the PDCCH should be the same as the reception beam used when the receiving power is largest used when the RS corresponding to the TCI state information is received, or as the reception beam corresponding to the sending beam used when sending the RS corresponding to the spatial relationship information. After that, the terminal device can use the multiple different reception beams determined above to receive the at least two PDCCHs.

In some optional embodiments, the at least two PDCCHs carry different content.

In this case, in order to achieve the joint repeat transmission of control channels and data channels, the at least two data channels carry different content.

Optionally, the at least two PDCCHs carry different content, which may include any of the following cases.

Case 1: the at least two PDCCHs are from different cells, and the at least two PDCCHs respectively schedule data transmission between the terminal device and the cells corresponding to the at least two PDCCHs.

Case 2: the at least two PDCCHs are from different TRPs of a same cell, and the at least two PDCCHs respectively schedule data transmission between the terminal device and the TRPs corresponding to the at least two PDCCHs.

Case 3: the at least two PDCCHs are from different panels of the same TRP, and the at least two PDCCHs respectively schedule data transmission between the terminal device and the panels corresponding to the at least two PDCCHs.

The following explains the transmission of the at least two data channels through multi-beam based on multi-TRP/panel.

The data channel may be a physical downlink shared channel (PDSCH) or a physical uplink shared channel (PUSCH).

1. The Data Channel is the PDSCH.

The PDSCH is a physical channel used for unicast data transmission. It is also used to transmit paging messages, random access response messages, and some system information.

In some optional embodiments, the network device sends the at least two PDSCHs; in which the at least two PDCCHs carry reception beam information for indicating the terminal device to receive the at least two PDSCHs.

Correspondingly, the terminal device receives the at least two PDSCHs according to the reception beam information indicated by the at least two PDCCHs.

The at least two PDSCHs are scheduled by at least two PDCCHs for transmission. In detail, one PDCCH can schedule one PDSCH; or schedule a set of PDSCHs that are repeatedly sent in mini-slots or slots. Since the at least two PDCCHs carry reception beam information, the terminal device can receive the at least two PDSCHs according to the reception beam information indicated by the received at least two PDCCHs.

In one possible design, the at least two PDSCHs are from different cells. In another possible design, the at least two PDSCHs are from different TRPs of a same cell. In another possible design, the at least two PDSCHs are from different panels at the same TRP.

For the network device, in one possible design, the network device sends the at least two PDSCHs through different cells. In another possible design, the network device sends the at least two PDSCHs through different TRPs of a same cell. In another possible design, the network device sends the at least two PDSCHs through different panels at the same TRP.

The at least two PDSCHs are sent by the network device through different panels. Different panels can belong to different cells, can also belong to different TRPs of a same cell, or can belong to different panels in the same TRP. Since different panels have different transmission directions, the terminal device also needs to use different panels (corresponding to different reception beams) to receive the at least two PDSCHs.

For some examples, the at least two PDSCHs include a first PDSCH and a second PDSCH. The first PDSCH comes from the serving cell, and the second PDSCH comes from the neighboring cell. The network device uses sending beam a and sending beam b to respectively send the above two PDSCHs, and the terminal device uses corresponding reception beam c and reception beam d respectively receives the above two PDSCHs.

Optionally, the network device uses different sending beams to send the at least two PDSCHs. Correspondingly, the terminal device determines different reception beams according to the reception beam information indicated by the at least two PDCCHs; and uses different reception beams to receive the at least two PDSCHs.

The reception beam information may be TCI state information (or spatial relationship information). The process for the terminal device to determine the reception beam through the TCI state information (or spatial relationship information) may include: the network device notifies the terminal device of at least one piece of TCI state information (or spatial relationship information) through the RRC signaling, including TCI state information (or spatial relationship information) and its corresponding RS type and RS identifier; if the RRC signaling informs multiple pieces of TCI state information (or spatial relationship information), the network device uses the MAC signaling to activate M pieces of TCI state information (or spatial relationship information) in the above multiple pieces of TCI status information (or spatial relationship information), and uses the DCI signaling to indicate one of the M pieces of TCI state information (or spatial relationship information), and the indicated TCI state information (or spatial relationship information) is the TCI (or spatial relationship information) of the PDSCH which is given by the network device for the terminal device, that is, the network device informs the terminal device that the reception beam used when receiving the PDSCH should be the same as the reception beam used to receive the RS corresponding to the TCI state information, or the reception beam corresponding to the sending beam used for sending the RS corresponding to the spatial relationship information. After that, the terminal device can use the multiple different reception beams determined above to receive the at least two PDSCHs.

2. The Data Channel is the PUSCH.

The PUSCH is an uplink corresponding channel of the PDSCH. The uplink component carrier of each terminal device has at most one PUSCH.

In some optional embodiments, the terminal device sends the at least two PUSCHs according to sending beam information indicated by the at least two PDCCHs.

Correspondingly, the network device receives the at least two PUSCHs; in which the at least two PUSCHs are sent by the terminal device according to the sending beam information indicated by the at least two PDCCHs.

The at least two PUSCHs are scheduled by the at least two PDCCHs for transmission. In detail, one PDCCH can schedule one PUSCH, or schedule a set of PUSCHs that are repeatedly sent using mini-slots or slots. Since the at least two PDCCHs carry sending beam information, the terminal device can send the at least two PUSCHs according to the sending beam information indicated by the at least two PDCCHs.

In one possible design, the at least two PUSCHs are sent to different cells. In another possible design, the at least two PUSCHs are sent to different TRPs of a same cell. In another possible design, the at least two PUSCHs are sent to different panels at the same TRP.

For the network device, in one possible design, the network device receives the at least two PUSCHs through different cells. In another possible design, the network device receives the at least two PUSCHs through different TRPs of a same cell. In another possible design, the network device receives the at least two PUSCHs through different panels at the same TRP.

The at least two PUSCHs are sent by the terminal device through different panels according to the sending beam information indicated by the at least two PDCCHs. The network device may receive using different panels. Different panels can belong to different cells, or belong to different TRPs of a same cell, or belong to different panels in the same TRP. Since transmission directions of different panels of the terminal device are different, the network device also needs to use different panels (corresponding to different reception beams) to receive the at least two PUSCHs.

For some examples, the at least two PUSCHs include a first PUSCH and a second PUSCH. The first PUSCH comes from panel 1 of the terminal device, and the second PUSCH comes from panel 2 of the terminal device. The terminal device uses sending beam a and sending beam b to respectively send the above two PUSCHs, and the network device uses corresponding reception beam c and reception beam d respectively receives the above two PUSCHs.

Optionally, the terminal device determines different sending beams according to the sending beam information indicated by the at least two PDCCHs; and uses different sending beams to send the at least two PUSCHs. Correspondingly, the network device uses different reception beams to receive the at least two PUSCHs.

The sending beam information may be spatial relationship information (or TCI state information). The process for the terminal device to determine the sending beam through the spatial relationship information (or TCI state information) may include: the network device notifies the terminal device of at least one piece of spatial relationship information (or TCI state information) through the RRC signaling, which may include the spatial relationship information (or TCI state Information) and its corresponding RS type and RS identifier; if the RRC signaling informs multiple pieces of spatial relationship information (or TCI status information), the network device uses the MAC signaling to activate M pieces of spatial relationship information (or TCI status information) in the multiple pieces of spatial relationship information (or TCI status information), and then uses the DCI signaling to indicate one of the M pieces of spatial relationship information (or TCI state information), and the indicated spatial relationship information (or TCI state information) is the spatial relationship information (or TCI state information) of the PUSCH which the network device gives to the terminal device, that is, it informs the terminal device that the sending beam used when sending the PUSCH should be the same as the sending beam used corresponding to the RS of the spatial relationship information or as the sending beam corresponding to the reception beam when the terminal device receives the RS corresponding to the TCI state. After that, the terminal can use the multiple different sending beams determined above to send the at least two PUSCHs.

In the following, the sequence of the at least two PDCCHs and the at least two data channels (PDSCHs or PUSCHs) in the time domain will be explained.

The at least two PDCCHs are adjacent in the time domain position; or, the first PDCCH and the first data channel are adjacent in the time domain position, in which the first data channel is scheduled by the first PDCCH for transmission, and the first PDCCH is any one of the at least two PDCCHs.

For some examples, the at least two PDCCHs include PDCCH 1, PDCCH 2, and PDCCH 3. The at least two data channels include PDSCH 1, PDSCH 2, and PDSCH 3. PDSCH 1 is scheduled by PDCCH 1 for transmission; PDSCH 2 is scheduled by PDCCH 2 for transmission; and PDSCH 3 is scheduled by PDCCH 3 for transmission. Or, two or three of PDCCH 1, PDCCH 2, and PDCCH 3 carry same content, that is, two or three of PDSCH 1, PDSCH 2, and PDSCH 3 are scheduled at the same time, such as PDCCH 1 and PDCCH 2 carry same content, and PDSCH 1 and PDSCH 2 are scheduled at the same time. Positions of the above 6 channels in the time domain can be PDCCH 1, PDCCH 2, PDCCH 3, PDSCH 1, PDSCH 2, PDSCH 3, corresponding to the at least two PDCCHs adjacent to each other in the time domain position; or PDCCH 1, PDSCH 1, PDCCH 2, PDSCH 2, PDCCH 3, PDSCH 3, corresponding to the first PDCCH and the first data channel being adjacent in the time domain position.

In some optional embodiments, the at least two PDCCHs include a second PDCCH and a third PDCCH, and the at least two data channels include a second set of data channel sets and a third set of data channel sets.

The sequence of time domain positions of the second PDCCH, the third PDCCH, the second set of data channels, and the third set of data channels includes: the second PDCCH, the third PDCCH, the second set of data channels, and the third set of data channels; or, the second PDCCH, the second set of data channels, the third PDCCH, and the third set of data channels; in which the second set of data channels is scheduled by the second PDCCH for transmission, and the third set of data channels is scheduled by the third PDCCH for transmission. Or, the second PDCCH and the third PDCCH carry same content, and the second set of data channels and the third set of data channels are scheduled at the same time.

The second set of data channels may include one second data channel or multiple repeat second data channels scheduled by the second PDCCH (or the second PDCCH and the third PDCCH). For some examples, the second set of data channels includes a second data channel. For some examples, the second set of data channels includes a second data channel, a second data channel, and a second data channel, and at this time, the second set of data channels is data channels sent in mini-slot mode or time slot mode and scheduled by the second PDCCH (or the second PDCCH and the third PDCCH). For some examples, the second set of data channels includes data of the second data channel. For some examples, the second set of data channels includes data of the second data channel, data of the second data channel, and data of the second data channel.

Similarly, the third set of data channels may include one third data channel or multiple repeat third data channels scheduled by the third PDCCH (or the second PDCCH and the third PDCCH). For some examples, the third set of data channels includes a third data channel. For some examples, the third set of data channels includes a third data channel, a third data channel, and a third data channel, and at this time, the third set of data channels is data channels sent in mini-slot mode or time slot mode and scheduled the third PDCCH (or the second PDCCH and the third PDCCH). For some examples, the third set of data channels includes data of the third data channel. For some examples, the third set of data channels includes data of the third data channel, data of the third data channel, and data of the third data channel.

Figure 4:
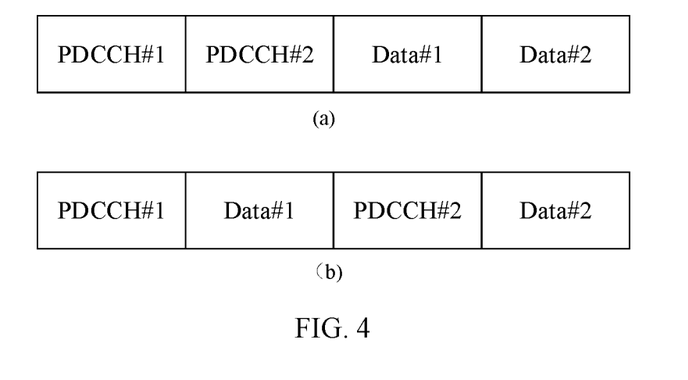
FIG. 4 is a schematic diagram of a method for data transmission according to some embodiments of the disclosure.

For some examples, referring to FIG. 4, the second PDCCH is PDCCH #1, the third PDCCH is PDCCH #2, the second set of data channels includes one second data channel Data #1 scheduled by the second PDCCH (or the second PDCCH and the third PDCCH) for transmission, and the third set of data channels includes one third data channel Data #2 scheduled by the third PDCCH (or the second PDCCH and the third PDCCH) for transmission.

As illustrated in FIG. 4(a), the sequence of time domain positions of the second PDCCH, the third PDCCH, the second set of data channels and the third set of data channels may be: PDCCH #1, PDCCH #2, Data #1, Data #2, corresponding to the second PDCCH, the third PDCCH, the second set of data channels, and the third set of data channels.

As illustrated in FIG. 4(a), the sequence of time domain positions of the second PDCCH, the third PDCCH, the second set of data channels and the third set of data channels may be: PDCCH #1, Data #1, PDCCH #2, Data #2, corresponding to the second PDCCH, the second set of data channels, the third PDCCH, and the third set of data channels.

Figure 5:
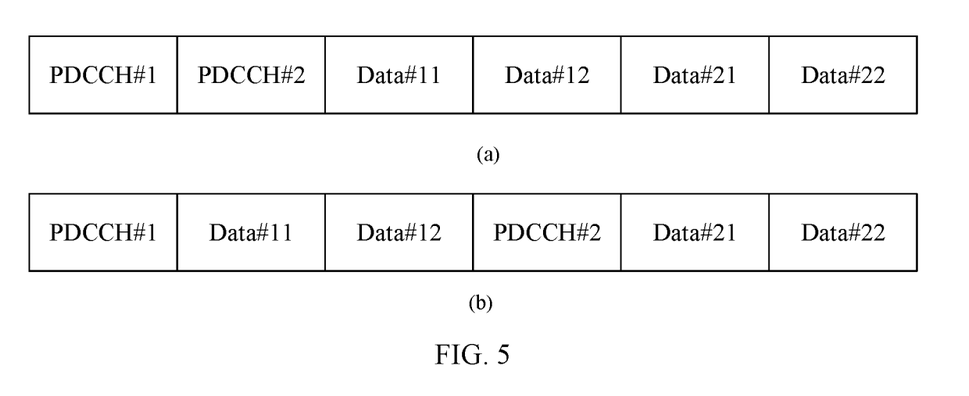
FIG. 5 is a schematic diagram of a method for data transmission according to some embodiments of the disclosure.

For some examples, referring to FIG. 5, the second PDCCH is PDCCH #1, the third PDCCH is PDCCH #2, the second set of data channels includes Data #11 and Data #12 of two repeat transmissions of the second data channel scheduled by the second PDCCH (or the second PDCCH and the third PDCCH) for transmission, and the third set of data channels includes Data #21 and Data #22 of two repeat transmissions of the third data channel scheduled by the third PDCCH (or the second PDCCH and the third PDCCH) for transmission.

As illustrated in FIG. 5(a), the sequence of time domain positions of the second PDCCH, the third PDCCH, the second set of data channels and the third set of data channels may be: PDCCH #1, PDCCH #2, Data #11, Data #12, Data #21, Data #22, corresponding to the second PDCCH, the third PDCCH, the second set of data channels, and the third set of data channels.

As illustrated in FIG. 5(b), the sequence of time domain positions of the second PDCCH, the third PDCCH, the second set of data channels and the third set of data channels may be: PDCCH #1, Data #11, Data #12, PDCCH #2, Data #21, Data #22, corresponding to the second PDCCH, the second set of data channels, the third PDCCH, and the third set of data channels.

Optionally, for the at least two PDCCHs and the at least two data channels, each channel may occupy one slot, or every n channels may occupy one slot, and n is a positive integer. The slot is a basic unit in the time domain for scheduling, and time lengths of different time slots correspond to different subcarrier intervals in the frequency domain. The disclosure does not limit the time length of the slot.

For some examples, referring to FIG. 4(a), PDCCH #1, PDCCH #2, Data #1, and Data #2 may occupy one slot respectively; or PDCCH #1 and PDCCH #2 may occupy one slot, and Data #1 and Data #2 occupy one slot; or PDCCH #1, PDCCH #2, Data #1, and Data #2 may occupy one slot.

For some examples, referring to FIG. 4(b), PDCCH #1, Data #1, PDCCH #2, and Data #2 may occupy one slot respectively; or PDCCH #1 and Data #1 may also occupy one slot, and PDCCH #2 and Data #2 occupy one slot; or PDCCH #1, Data #1, PDCCH #2, and Data #2 may occupy one slot.

For some examples, referring to FIG. 5(b), PDCCH #1, Data #11, Data #12, PDCCH #2, Data #21, and Data #22 may occupy one slot respectively; or PDCCH #1 and Data #11, and Data #12 occupy one slot, and PDCCH #2, Data #21, and Data #22 occupy one slot; or PDCCH #1, Data #11, Data #12, PDCCH #2, Data #21, and Data #22 occupy one slot.

In some optional embodiments, the terminal device is set with a beam switching time, the beam switching time is N symbols, and N is 0 or a positive integer.

The terminal device performs beam switching during the beam switching time and may not send PDCCHs or data channels.

For some examples, referring to FIG. 4(a), due to the use of different panels, between PDCCH #1 and PDCCH #2, between PDCCH #2 and Data #1, and between Data #1 and Data #2, the panel switching is required. If the terminal does not need time to switch between panels, the terminal does not need to vacate symbols for beam switching; if the terminal needs time to switch between panels, the terminal needs to vacate symbols for beam switching.

Referring to FIG. 4(b), the panel switching is required between Data #1 and PDCCH #2. If the terminal does not need time to switch between panels, the terminal does not need to vacate symbols for beam switching; if the terminal needs time to switch between panels, the terminal needs to vacate symbols for beam switching. When using the same beam, there is no need for beam switching between PDCCH #1 and Data #1 and between PDCCH #2 and Data #2. When using different beams, L symbols are required for beam switching between PDCCH #1 and Data #1 and between PDCCH #2 and Data #2, where L is a natural number.

In summary, with the method provided in some embodiments, the at least two PDCCHs and the at least two data channels can be sent/received between the terminal device and the network device. The at least two PDCCHs carry same content, or the at least two data channels carry same content, or the at least two PDCCHs carry same content and the at least two data channels carry same content, to realize the joint repeat transmission of control channels and data channels, which improves the communication robustness.

The method provided in some embodiments explains in detail the joint repeat transmission of control channels and data channels between the network device and the terminal device through multi-beams. This method for data transmission can support data transmission based on multi-TRP/panel, which is suitable for future evolution, and further improve the communication robustness.

Figure 6:
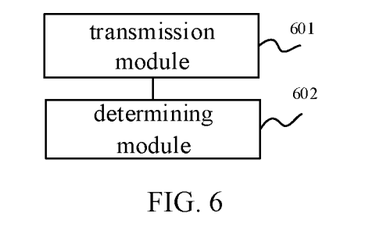
FIG. 6 is a block diagram of an apparatus for data transmission according to some embodiments of the disclosure.

FIG. 6 illustrates a block diagram of an apparatus for data transmission according to some embodiments of the disclosure. The apparatus can be implemented as a terminal device, or as a part of a terminal device. The apparatus includes a transmission module 601.

The transmission module 601 is configured to receive at least two PDCCHs and transmit at least two data channels, in which the at least two data channels are scheduled by the at least two PDCCHs, and the at least two PDCCHs carry same content, or the at least two data channels carry same content, or the at least two PDCCHs carry same content and the at least two data channels carry same content.

In some embodiments, the transmission module 601 is configured to receive the at least two PDCCHs using different reception beams.

In some embodiments, the at least two PDCCHs are from different cells; or, the at least two PDCCHs are from different TRPs of a same cell; or, the at least two PDCCHs are from different panels of the same TRP.

In some embodiments, the at least two PDCCHs carry different content; the at least two PDCCHs are from different cells, and the at least two PDCCHs respectively schedule data transmission between the terminal device and the cells corresponding to the at least two PDCCHs; or, the at least two PDCCHs are from different TRPs, and the at least two PDCCHs respectively schedule data transmission between the terminal device and the TRPs corresponding to the at least two PDCCHs; or, the at least two PDCCHs are from different panels, and the at least two PDCCHs respectively schedule data transmission between the terminal device and the panels corresponding to the at least two PDCCHs.

In some embodiments, the data channel is a PDSCH, and the transmission module 601 is configured to receive at least two PDSCHs according to reception beam information indicated by the at least two PDCCHs.

In some embodiments, the apparatus further includes: a determining module 602, configured to determine different reception beams according to the reception beam information indicated by the at least two PDCCHs; and the transmission module 601 is configured to receive the at least two PDSCHs using the different reception beams.

In some embodiments, the at least two PDSCHs are from different cells; or, the at least two PDSCHs are from different TRPs of a same cell; or, the at least two PDSCHs are from different panels of the same TRP.

In some embodiments, the data channel is a PUSCH; the transmission module 601 is configured to send at least two PUSCHs according to sending beam information indicated by the at least two PDCCHs.

In some embodiments, the apparatus further includes a determining module 602 configured to determine different sending beams according to the sending beam information indicated by the at least two PDCCHs; and the transmission module 601 is configured to send the at least two PUSCHs using the different sending beams.

In some embodiments, the transmission module 601 is configured to send the at least two PUSCHs to different cells; or, the transmission module 601 is configured to send the at least two PUSCHs to different TRPs of a same cell; or, the transmission module 601 is configured to send the at least two PUSCHs to different panels of the same TRP.

In some embodiments, the at least two PDCCHs are adjacent in time domain position; or, a first PDCCH and a first data channel are adjacent in time domain position; in which the first data channel is scheduled by the first PDCCH for transmission, and the first PDCCH is any one of the at least two PDCCHs.

In some embodiments, the at least two PDCCHs comprise a second PDCCH and a third PDCCH, and the at least two data channels comprise a second set of data channels and a third set of data channels; a sequence of time domain positions of the second PDCCH, the third PDCCH, the second set of data channels and the third set of data channels includes: the second PDCCH, the third PDCCH, the second set of data channels, and the third set of data channels; or, the second PDCCH, the second set of data channels, the third PDCCH, and the third set of data channels; in which the second set of data channels is scheduled by the second PDCCH, and the third set of data channels is scheduled by the third PDCCH.

In some embodiments, the terminal device is set with beam switching time, the beam switching time is N symbols, and N is 0 or a positive integer.

Figure 7:
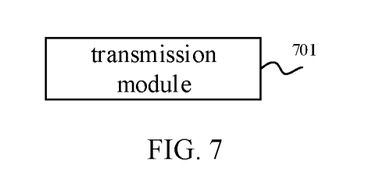
FIG. 7 is a block diagram of an apparatus for data transmission according to some embodiments of the disclosure.

FIG. 7 illustrates a block diagram of an apparatus for data transmission according to some embodiments of the disclosure. The apparatus can be implemented as a network device, or as a part of a network device. The apparatus includes a transmission module 701.

The transmission module 701 is configured to send at least two PDCCHs and transmit at least two data channels, in which the at least two data channels are scheduled by the at least two PDCCHs; and the at least two PDCCHs carry same content, or the at least two data channels carry same content, or the at least two PDCCHs carry same content and the at least two data channels carry same content.

In some embodiments, the transmission module 701 is configured to send the at least two PDCCHs using different sending beams.

In some embodiments, the transmission module 701 is configured to send the at least two PDCCHs using different cells; or, the transmission module 701 is configured to send the at least two PDCCHs using different TRPs of a same cell; or, the transmission module 701 is configured to send the at least two PDCCHs using different panels of the same TRP.

In some embodiments, the at least two PDCCHs carry different content; in response to sending the at least two PDCCHs using different cells, the at least two PDCCHs respectively schedule data transmission between the terminal device and the cells corresponding to the at least two PDCCHs; or, in response to sending the at least two PDCCHs using different TRPs, the at least two PDCCHs respectively schedule data transmission between the terminal device and the TRPs corresponding to the at least two PDCCHs; or, in response to sending the at least two PDCCHs using different panels, the at least two PDCCHs respectively schedule data transmission between the terminal device and the panels corresponding to the at least two PDCCHs.

In some embodiments, the data channel is a PDSCH; and the transmission module 701 is configured to send at least two PDSCHs, in which the at least two PDCCHs carry reception beam information for indicating a terminal device to receive the at least two PDSCHs.

In some embodiments, the transmission module 701 is configured to send the at least two PDSCHs using different sending beams.

In some embodiments, the transmission module 701 is configured to send the at least two PDSCHs using different cells; or, the transmission module 701 is configured to send the at least two PDSCHs using different TRPs of a same cell; or, the transmission module 701 is configured to send the at least two PDSCHs using different panels of the same TRP.

In some embodiments, the data channel is a PUSCH; and the transmission module 701 is configured to receive at least two PUSCHs, in which the at least two PUSCHs are sent by a terminal device according to sending beam information indicated by the at least two PDCCH.

In some embodiments, the transmission module 701 is configured to receive the at least two PUSCH using different reception beams.

In some embodiments, the transmission module 701 is configured to receive the at least two PUSCH using different cells; or, the transmission module 701 is configured to receive the at least two PUSCH using different TRPs of a same cell; or, the transmission module 701 is configured to receive the at least two PUSCH using different panels of the same TRP.

In some embodiments, the at least two PDCCHs are adjacent in time domain position; or, a first PDCCH and a first data channel are adjacent in time domain position; in which the first data channel is scheduled by the first PDCCH for transmission, and the first PDCCH is any one of the at least two PDCCHs.

In some embodiments, the at least two PDCCHs comprise a second PDCCH and a third PDCCH, and the at least two data channels comprise a second set of data channels and a third set of data channels; a sequence of time domain positions of the second PDCCH, the third PDCCH, the second set of data channels and the third set of data channels includes: the second PDCCH, the third PDCCH, the second set of data channels, and the third set of data channels; or, the second PDCCH, the second set of data channels, the third PDCCH, and the third set of data channels; in which the second set of data channels is scheduled by the second PDCCH, and the third set of data channels is scheduled by the third PDCCH.

Figure 8:
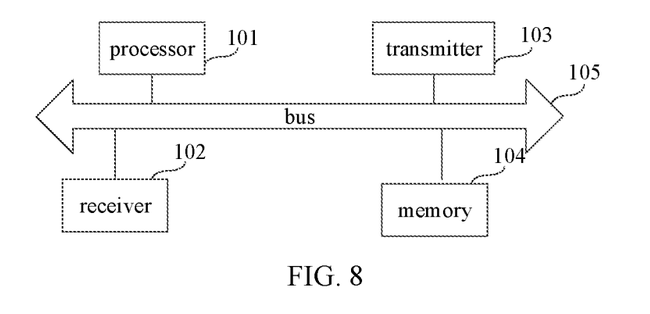
FIG. 8 is a block diagram of a communication device according to some embodiments of the disclosure.

FIG. 8 illustrates a structural schematic diagram of a communication device (a terminal device or a network device) according to some embodiments of the disclosure. The communication device includes a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as a communication component, and the communication component may be a communication chip.

The memory 104 is connected to the processor 101 through a bus 105.

The memory 104 may be used to store at least one instruction, and the processor 101 is configured to execute the at least one instruction to implement each step in the foregoing method embodiments.

In addition, the memory 104 can be implemented by any type of volatile or non-volatile storage device or a combination thereof. The volatile or non-volatile storage device includes, but is not limited to: magnetic disk or optical disk, erasable programmable read only memory (EEPROM), erasable programmable read only memory (EPROM), static random-access memory (SRAM), read-only memory (ROM), magnetic memory, flash memory, or programmable read-only memory (PROM).

In some embodiments, a computer-readable storage medium is also provided. The computer-readable storage medium stores at least one instruction, at least one program, code set, or instruction set. The at least one instruction, at least one program, code set, or instruction set is loaded and executed by the processor to implement the method that is performed by the communication device provided by the foregoing method embodiments.

Those skilled in the art can understand that all or part of the steps in the foregoing embodiments can be implemented by hardware or by program instructing related hardware. The program can be stored in a computer-readable storage medium. The storage medium mentioned can be a read-only memory, a magnetic disk, an optical disk, or the like.

The above are only optional embodiments of the disclosure and are not intended to limit the disclosure. Any modification, equivalent replacement, improvement, and the like made within the spirit and principle of the disclosure shall be included in the protection range of the disclosure.

The invention claimed is:

1. A method for data transmission, comprising:
receiving, by a terminal device, at least two physical downlink control channels (PDCCHs) using different reception beams; and
transmitting, by the terminal device, at least two data channels, wherein the at least two data channels are scheduled by the at least two PDCCHs for transmission;
wherein transmitting the at least two data channels comprises: determining different reception beams according to reception beam information indicated by the at least two PDCCHs; and receiving at least two physical downlink shared channels (PDSCHs) using the different reception beams;
wherein the at least two PDCCHs are from different transmission-reception points of a same cell;
wherein the at least two PDCCHs carry same content, or the at least two data channels carry same content, or the at least two PDCCHs carry same content and the at least two data channels carry same content;
wherein, the at least two PDCCHs are adjacent in time domain position or a first PDCCH of the at least two PDCCHs and a first set of data channels of the at least two data channels are adjacent in time domain position;
wherein the first set of data channel is scheduled by the first PDCCH for transmission, and the first PDCCH is any one of the at least two PDCCHs;
wherein the at least two PDCCHs comprise a second PDCCH and a third PDCCH, and the at least two data channels comprise a second set of data channels and a third set of data channels, wherein a sequence of time domain positions of the second PDCCH, the third PDCCH, the second set of data channels, and the third set of data channels further comprises:
the second PDCCH, the second set of data channels, the third PDCCH, and the third set of data channels.

2. The method as claimed in claim 1, wherein,
the at least two PDSCHs are from different cells;
or, the at least two PDSCHs are from different transmission-reception points of a same cell;
or, the at least two PDSCHs are from different panels of a same transmission-reception point.

3. The method as claimed in claim 1, wherein,
the terminal device is set with beam switching time, the beam switching time is N symbols, and N is 0 or a positive integer.

4. A method for data transmission, comprising:
sending, by a network device, at least two physical downlink control channels (PDCCHs) using different sending beams; and
transmitting, by the network device, at least two data channels, wherein the at least two data channels are scheduled by the at least two PDCCHs for transmission;
wherein transmitting the at least two data channel comprises: sending at least two physical downlink shared channel (PDSCHs) using different sending beams, wherein the at least two PDCCHs carry reception beam information for indicating a terminal device to receive the at least two PDSCHs;
wherein the at least two PDCCHs are sent using different transmission-reception points of a same cell;
wherein the at least two PDCCHs carry same content or the at least two PDCCHs carry same content and the at least two data channels carry same content;
wherein, the at least two PDCCHs are adjacent in time domain position or a first PDCCH of the at least two PDCCHs and a first set of data channels of the at least two data channels are adjacent in time domain position;
wherein the first set of data channel is scheduled by the first PDCCH for transmission, and the first PDCCH is any one of the at least two PDCCHs;
wherein the at least two PDCCHs comprise a second PDCCH and a third PDCCH, and the at least two data channels comprise a second set of data channels and a third set of data channels, wherein a sequence of time domain positions of the second PDCCH, the third PDCCH, the second set of data channels, and the third set of data channels further comprises:
the second PDCCH, the second set of data channels, the third PDCCH, and the third set of data channels.

5. A terminal device, comprising:
a processor;
a transceiver connected to the processor; and
a memory for storing instructions executable by the processor;
wherein the processor is configured to load and execute the instructions to:
receive at least two physical downlink control channels (PDCCHs) using different reception beams; and
transmit at least two data channels, wherein the at least two data channels are scheduled by the at least two PDCCHs for transmission;
wherein transmitting the at least two data channels comprises: determining different reception beams according to reception beam information indicated by the at least two PDCCHs; and
receiving at least two physical downlink shared channels (PDSCHs) using the different reception beams;

wherein the at least two PDCCHs are sent using different transmission-reception points of a same cell;

wherein the at least two PDCCHs carry same content or the at least two PDCCHs carry same content and the at least two data channels carry same content;

wherein the at least two PDCCHs are adjacent in time domain position or a first PDCCH of the at least two PDCCHs and a first set of data channels of the at least two data channels are adjacent in time domain position;

wherein the first set of data channel is scheduled by the first PDCCH for transmission, and the first PDCCH is any one of the at least two PDCCHs;

wherein the at least two PDCCHs comprise a second PDCCH and a third PDCCH, and the at least two data channels comprise a second set of data channels and a third set of data channels, wherein a sequence of time domain positions of the second PDCCH, the third PDCCH, the second set of data channels, and the third set of data channels further comprises:

the second PDCCH, the second set of data channels, the third PDCCH, and the third set of data channels.

6. A network device, comprising:

a processor;

a transceiver connected to the processor; and a memory for storing instructions executable by the processor;

wherein the processor is configured to load and execute the instructions to perform the method for data transmission as claimed in claim 4.

* * * * *